(No Model.)
J. H. McCLURE & G. F. MURDOCK.
CAR TRUCK.
No. 296,988. Patented Apr. 15, 1884.
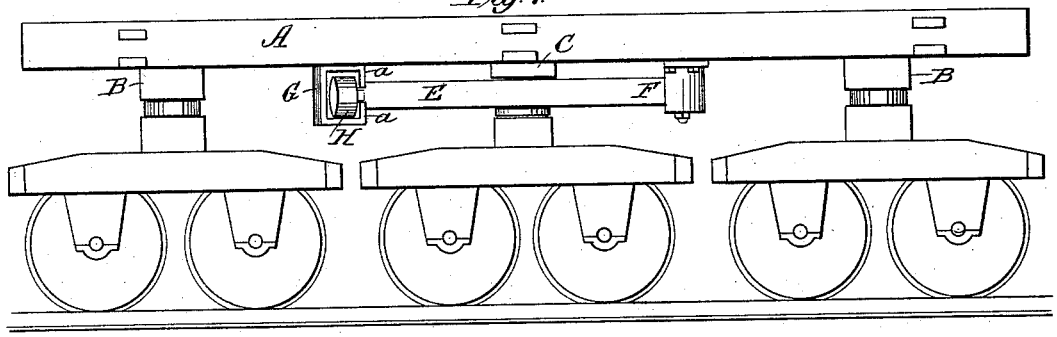
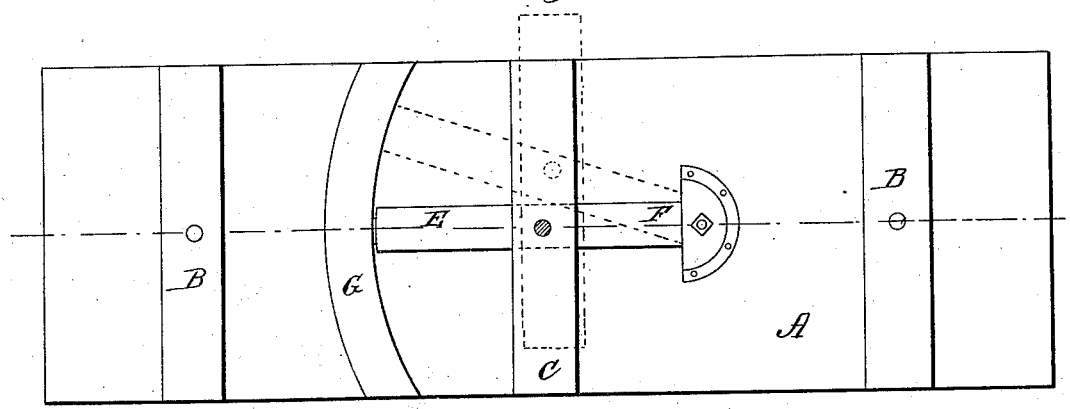
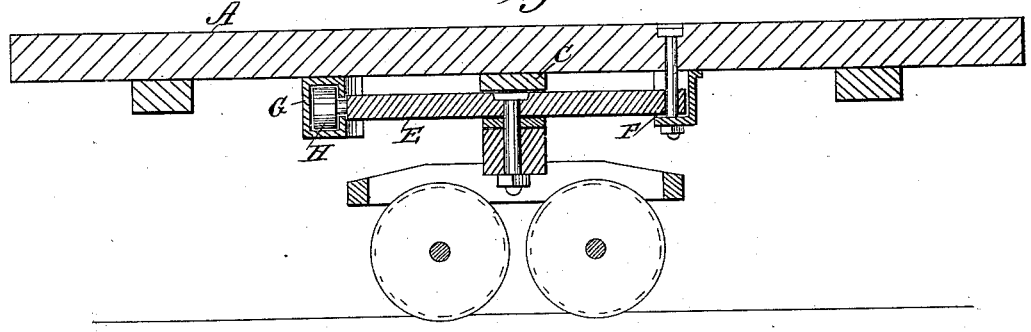
WITNESSES:
W. W. Hollingsworth
W. K. Stevens.
INVENTOR:
J. H. McClure
G. F. Murdock
BY Munn & Co
ATTORNEYS.

UNITED STATES PATENT OFFICE.

JAMES H. McCLURE AND GEORGE F. MURDOCK, OF WELLSVILLE, OHIO.

CAR-TRUCK.

SPECIFICATION forming part of Letters Patent No. 296,988, dated April 15, 1884.

Application filed February 20, 1884. (No model.)

*To all whom it may concern:*

Be it known that we, JAMES H. MCCLURE and GEORGE F. MURDOCK, citizens of the United States, residing at Wellsville, in the county of Columbiana and State of Ohio, have invented certain new and useful Improvements in Railroad-Car Trucks, of which the following is a description.

This invention relates to those portions of a railway-car upon which the body is mounted, called the "trucks." While twenty-eight or thirty feet is the length usually adopted for freight-cars, it would frequently be a matter of great economy to have longer cars—as, for instance, in carrying long lumber, &c.; but it is found impracticable and unsafe to mount cars very much longer on only two trucks, because the center of the car is not sufficiently supported and guided by the trucks at the ends. At the same time the sharp curves which occur on most railroads would render the addition of a truck in the center of the car impracticable if attached as usual to the car.

The object of our invention is to provide means whereby cars of any reasonable length may be mounted on three trucks each, and the third or central truck be enabled to follow curved tracks.

To this end our invention consists in the construction and combination of parts forming a railroad-truck hereinafter described and claimed, reference being had to the accompanying drawings, in which—

Figure 1 is a side elevation of a platform-car, showing our invention. Fig. 2 is an inverted plan view of the same with the truck-wheels and the main body of the trucks removed, and Fig. 3 is a longitudinal vertical section through our central truck.

A represents the body of the car, constructed in any usual manner.

B represents the central bolsters of the two end trucks, upon which the car is mounted by the usual king-bolts.

C represents a like bolster of our central truck.

E is a strong beam pivoted at one end, F, to the car-body, and provided at its other end with a roller, H, adapted to run in a way, G. This way is the arc of a circle, with pivot F as a center, and it is provided with internal flanges, *a*, to prevent the possible escape of roller H. Beam E may be bored in at its pivot end in any usual manner to insure a strong hinge or pivot joint securing the truck to the car. The way G is rigidly bolted to the car-body. By means of this swinging connection, we so attach the middle truck that it may have lateral motion from side to side out of line with the end trucks, to adapt itself to curved tracks. By this means the length of a car may be doubled, while all the expense of making two car ends, two connections, one brake, and one truck is saved. At the same time the carrying capacity of a double-length car is more than double that of one single car, with the added advantage of its ability to carry longer freight.

What we claim as our invention, and wish to secure by Letters Patent, is—

1. The combination, with a railway-car mounted upon two end trucks, of a beam pivoted at one end to the car, a truck supporting the beam midway upon a pivot, and means, substantially as described, connecting the other end of the said beam with the car, as and for the purpose specified.

2. The combination, with the car-body A, and the trucks connected therewith by bolsters B, of the beam E, pivoted at F to the car-body, the roller H on its other end, the segmental way G, and the bolster C of a truck pivoted to said beam E, as shown and described, for the purpose specified.

JAMES H. McCLURE.
GEORGE F. MURDOCK.

Witnesses:
THOS. THOMPSON,
HARRY A. McCLURE.